United States Patent
Chavez et al.

(10) Patent No.: US 8,696,019 B2
(45) Date of Patent: Apr. 15, 2014

(54) KNEE AIRBAG MODULE (75) Inventors: Spencer W. Chavez, Linden, MI (US);
Greg D. Kitts, Lake Orion, MI (US);
John P. Ruterbusch, Royal Oak, MI (US); Michael J. Lange, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 59 days.

(21) Appl. No.: 13/052,988

(22) Filed: Mar. 21, 2011

(65) Prior Publication Data
US 2012/0242066 A1    Sep. 27, 2012

(51) Int. Cl.
*B60R 21/206* (2011.01)
*B60R 21/237* (2006.01)
*B60R 21/16* (2006.01)
*B60R 21/231* (2011.01)

(52) U.S. Cl.
CPC .............. *B60R 21/206* (2013.01); *B60R 21/237* (2013.01); *B60R 2021/161* (2013.01); *B60R 2021/23169* (2013.01)
USPC ..................................... 280/730.1; 280/728.2

(58) Field of Classification Search
CPC  B60R 21/206; B60R 21/217; B60R 21/2176; B60R 21/237; B60R 2021/161; B60R 2021/23169
USPC ......... 280/728.3, 730.1, 731, 752, 728.2, 732
See application file for complete search history.

(56) References Cited

U.S. PATENT DOCUMENTS

| | | | | |
|---|---|---|---|---|
| 3,618,978 A * | 11/1971 | Klove et al. | ................ | 280/730.1 |
| 4,290,627 A * | 9/1981 | Cumming et al. | ............ | 280/729 |
| 5,458,366 A * | 10/1995 | Hock et al. | ..................... | 280/729 |
| 6,092,836 A * | 7/2000 | Saslecov | ..................... | 280/730.1 |
| 6,685,217 B2 * | 2/2004 | Abe | ........................... | 280/730.1 |
| 6,692,024 B2 * | 2/2004 | Fischer et al. | ............. | 280/743.1 |
| 6,902,186 B2 * | 6/2005 | Suzuki et al. | .............. | 280/730.1 |
| 7,090,245 B2 * | 8/2006 | Yoshikawa et al. | ........... | 280/729 |
| 7,226,075 B2 * | 6/2007 | Nagata et al. | ................. | 280/731 |
| 7,232,153 B2 * | 6/2007 | Kawauchimaru et al. | . | 280/743.1 |
| 7,314,232 B2 * | 1/2008 | Kashiwagi | ................ | 280/730.1 |
| 7,377,541 B2 * | 5/2008 | Abe et al. | ................... | 280/730.1 |
| 7,384,065 B2 * | 6/2008 | Takimoto et al. | ............ | 280/732 |
| 7,549,671 B2 * | 6/2009 | Mizuno et al. | ............. | 280/730.1 |
| 7,600,784 B2 * | 10/2009 | Kashiwagi | ................. | 280/743.2 |
| 7,669,895 B2 * | 3/2010 | Abe et al. | ................... | 280/743.2 |
| 7,744,118 B2 * | 6/2010 | Takimoto et al. | .......... | 280/730.1 |
| 7,845,673 B2 * | 12/2010 | Kashiwagi et al. | ........ | 280/730.1 |
| 7,850,198 B2 * | 12/2010 | Hayakawa et al. | ........ | 280/730.1 |
| 8,220,830 B2 * | 7/2012 | Takimoto et al. | .......... | 280/730.1 |
| 2002/0171231 A1 * | 11/2002 | Takimoto et al. | .......... | 280/730.1 |
| 2003/0015861 A1 * | 1/2003 | Abe | .......................... | 280/730.1 |

(Continued)

*Primary Examiner* — Paul N Dickson
*Assistant Examiner* — Timothy Wilhelm
(74) *Attorney, Agent, or Firm* — Foley & Lardner LLP (57) ABSTRACT

A knee airbag module for restraining an occupant seated in the interior compartment of a vehicle. The module includes an inflatable airbag cushion configured to deploy to a location forward of the legs of the seated occupant, and an inflator to supply inflation gas for inflating the cushion. The module further includes a housing configured to couple to the vehicle and a cover connected to the housing. The housing includes a base, a forward side wall and a rearward side wall, which together with the cover form a compartment for housing the airbag cushion prior to deployment, as well as the inflator. A portion of the rearward side wall is inclined to guide the deploying airbag cushion in an oblique direction when breaching the housing.

9 Claims, 9 Drawing Sheets

(56) References Cited

U.S. PATENT DOCUMENTS

| | | | |
|---|---|---|---|
| 2005/0230939 A1* | 10/2005 | Abe et al. | 280/728.2 |
| 2006/0022440 A1* | 2/2006 | Umehara | 280/730.1 |
| 2008/0116669 A1* | 5/2008 | Adachi et al. | 280/730.1 |
| 2009/0134611 A1* | 5/2009 | Wigger et al. | 280/730.1 |

* cited by examiner

KNEE AIRBAG MODULE

BACKGROUND

The present application relates generally to the field of knee airbags for use in vehicles. More specifically, this application relates to an airbag module having a knee airbag cushion configured to deploy from underneath the dashboard of the vehicle to provide restraint to an occupant of the vehicle to reduce the likelihood of injury to the restrained occupant.

SUMMARY

According to a disclosed embodiment, a knee airbag module for restraining an occupant seated in the interior compartment of a vehicle is provided. The module includes an inflatable airbag cushion configured to deploy to a location forward of the legs of the seated occupant, and an inflator to supply inflation gas for inflating the cushion. The module further includes a housing configured to couple to the vehicle and a cover connected to the housing. The housing includes a base, a forward side wall and a rearward side wall, which together with the cover form a compartment for housing the airbag cushion prior to deployment, as well as the inflator. A portion of the rearward side wall is inclined away from a vertical plane, a greater amount than a portion of the forward side wall, in order to guide the deploying airbag cushion in an oblique direction when breaching the housing.

The end portion of the airbag cushion may be rolled into a rolled portion and positioned in the housing so that the rolled portion faces away from the interior compartment of the vehicle. The airbag cushion may also include a folded portion provided adjacent to the rolled portion, wherein the folded portion may inflate prior to the end portion of the airbag cushion during deployment. The airbag cushion may be stored in the module in a position so that inflation of the folded portion of the airbag cushion during airbag deployment may create forces that induce the rolled portion of the cushion to deploy initially at the angle of incline formed by the rearward wall. The ratio of the length of the rolled portion of the cushion to the length of the folded portion of the cushion is preferably between 9:1 and 1:1, wherein the lengths of the cushion are cross-sectional profile lengths. The folded portion of the cushion may include one fold or more than one fold, such as two Z-folds, provided adjacent to one another. The module may also include a tether to influence the deployment trajectory of the airbag cushion during airbag deployment. The cover may be hingedly connected to the forward side wall so that when the airbag cushion deploys the cover and rearward side wall are disconnected and the cover and the forward side wall remain connected.

According to another disclosed embodiment, a knee airbag module for restraining an occupant seated in the interior compartment of a vehicle is provided, wherein the airbag module is configured to be mounted at a bottom portion of a dashboard of the vehicle. The module includes a housing configured to couple to the vehicle and a cover connected to the housing, wherein the cover is configured to face downward when the airbag module is installed and coupled to the vehicle. The module also includes an inflatable airbag cushion stored in the housing and configured to inflate and deploy out of the housing to a location forward of the legs of the seated occupant, and an inflator provided in the housing and configured to provide inflation gas to inflate the airbag cushion. The housing includes a base, a forward side wall and a rearward side wall and wherein the base and side walls together with the cover form a compartment for housing the airbag prior to deployment. The airbag cushion includes an end portion configured to deploy to a position farthest from the airbag module, and the end portion of the airbag cushion is rolled into a rolled portion and positioned in the housing so that the rolled portion faces away from the interior compartment of the vehicle and is located adjacent to the rearward side wall of the housing.

DETAILED DESCRIPTION

Knee airbags provide occupant protection by restraining the occupant during dynamic vehicle events, such as rapid decelerations caused by the vehicle impacting another vehicle or barrier. The knee airbag restrains the occupant by substantially reducing the inertia of the occupant and the resulting tendency of the occupant to submarine (i.e., where the legs of the occupant slide forward along the seat cushion leading with the knees and whereby the torso of the occupant follows sliding down the seat back and forward) during a frontal impact of the vehicle. Knee airbags also provide occupant protection by preventing impact of the occupant (e.g., the knees of the occupant) directly with features (e.g., dashboard) of the vehicle induced by a dynamic impact of the vehicle.

Knee airbag modules or systems include an inflatable airbag cushion that deploys during a dynamic vehicle event and inflates from gas which is rapidly pushed into the airbag cushion by means of an inflator or other inflating device. An inflator or inflator module may use a device, such as a pyrotechnic device or other airbag inflation device, to generate gas almost instantaneously and to push the gas at a high volumetric flow rate into the inflatable airbag cushion of the airbag system to enable the airbag cushion to deploy or unfold over a very short period of time. The airbag cushions of knee airbag modules are typically packaged through a process of folding, rolling, or a combination of folding and rolling to compact the airbag cushion to be able to fit into the small cross-section (and volume) of the storage area (and volume), such as the dashboard.

Figure 3A:
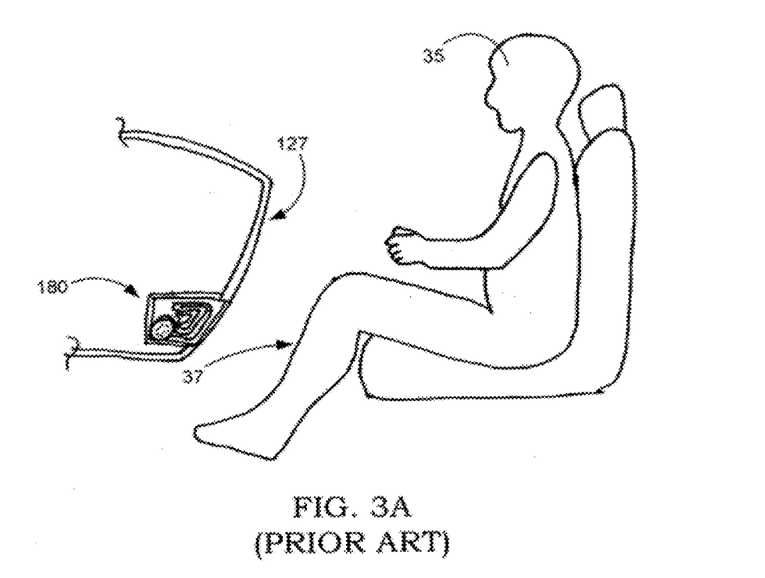
FIG. 3A is a side view of a conventional knee airbag stored within the dashboard and configured to deploy initially in the rearward direction toward the legs of the occupant.
Figure 3B:
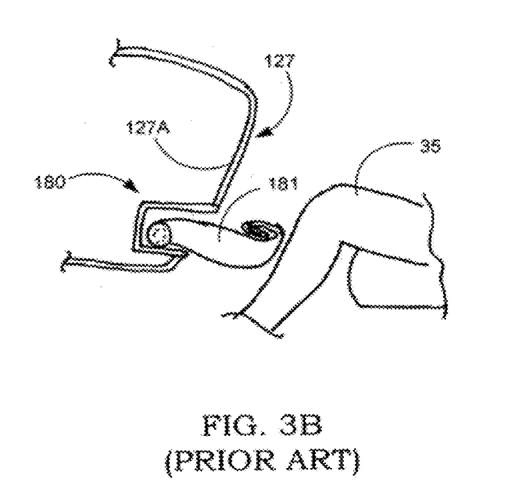
FIG. 3B is a side view of the conventional airbag of FIG. 3A shown during deployment.
Figure 3C:
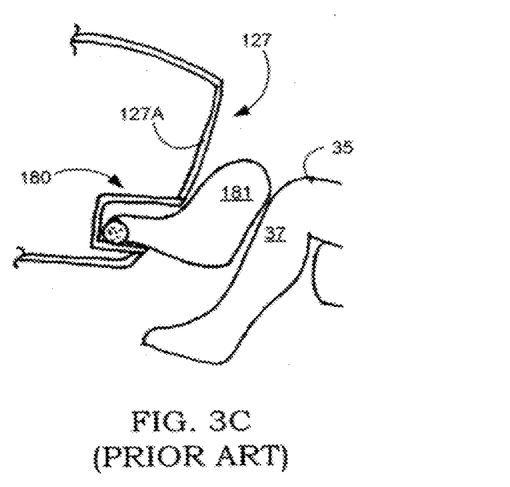
FIG. 3C is another side view of the conventional airbag of FIG. 3A shown during deployment.

Conventional knee airbag modules, such as the passenger knee airbag module 180 shown in FIGS. 3A-3C, are typically configured to be stored within the dashboard 127 (or other vehicle component) and to include an airbag cushion 181 that deploys from the substantially rearward facing portion or rearward wall 127A of the dashboard 127 in the rearward direction directly toward the occupant 35, such as toward the lower legs (e.g., tibia and fibula) 37 of the occupant 35.

The knee airbag modules of conventional configuration have several limitations or disadvantages. For example, the rearward deploying knee airbag module reduces the utility of the vehicle, such as by reducing the storage volume of the glove box, since the rearward deploying knee airbag module occupies the volume that otherwise would be usable glove box storage volume. The reduced usable storage volume of the dashboard is often exacerbated by the inclusion of a torso (or thorax) airbag module (not shown) that is typically provided within the dashboard and is configured to provide restraint (and protection) to the occupant, such as the torso or thorax of the occupant. The reduced volume in the rearward facing portion of the dashboard is not limited to a reduced glove box utility, as the reduced dashboard volume prevents packaging of other useful devices in the same volume, such as a radio or radio amplifier. Another disadvantage is that the rearward deploying knee airbag reduces the aesthetics of the interior of the vehicle.

A knee airbag module may be configured to couple to the bottom portion of the dashboard, where the airbag module includes an inflatable airbag cushion that initially deploys substantially in a downward and rearward oblique direction, then continues to deploy in a substantially upward oblique direction along the rearward facing wall of the dashboard. This configuration allows for optimization of the utility of the dashboard (e.g., glove box) and improved interior aesthetics.

Figure 1:
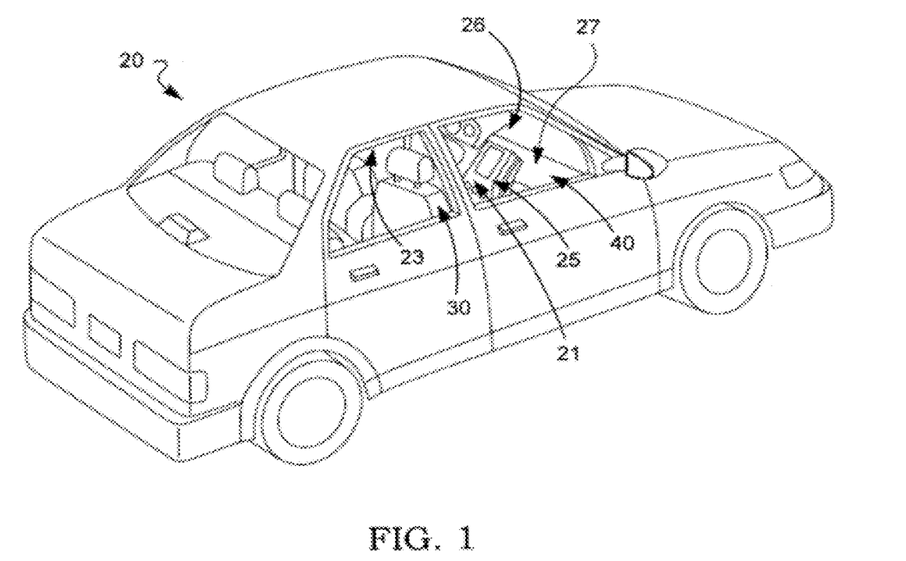
FIG. 1 is a perspective view of an exemplary embodiment of a motor vehicle.

As shown in FIG. 1, an automotive vehicle 20 may include an interior compartment 21. The interior compartment 21 may include a driver side 23 and a passenger side 25, where each may be configured to include at least one airbag module or system. The interior compartment 21 further includes a dashboard 27 extending about the width of the interior compartment 21 of the vehicle 20 and housing an instrument panel 26 and a storage compartment (not shown), such as a glovebox, to provide storage utility. The passenger side 25 and the driver side 23 of the interior compartment 21 include a seat assembly 30 to provide seating to an occupant (not shown) of vehicle 20. The interior compartment 21 may further include one or more than one airbag module 40 to provide restraint to at least one occupant upon deployment. Those skilled in the art will recognize that the knee airbag modules disclosed herein can be included within any passenger compartment (e.g., driver side, passenger side, rear passenger) and is not limited by the illustrations herein. It should be noted that the airbag modules disclosed herein may be incorporated to protect any occupant of any vehicle.

Figure 2:
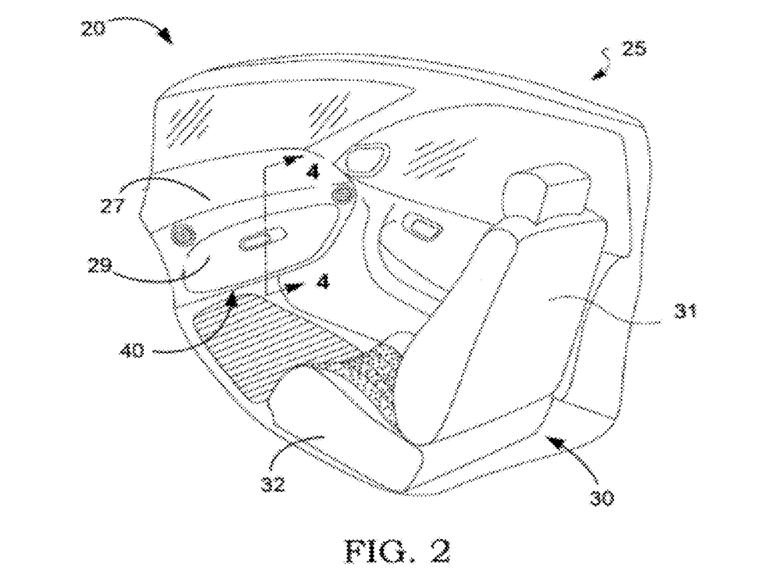
FIG. 2 is a perspective view of the passenger side of the interior compartment of a motor vehicle, such as the motor vehicle of FIG. 1.

As shown in FIG. 2, the passenger side 25 of the interior compartment 21 of vehicle 20 may include a seat assembly or system 30 configured to provide seating to a vehicle occupant (not shown). The seat system 30 includes a seat back 31 and a seat cushion (or bottom) 32. The dashboard 27 is shown forward of seat system 30 in vehicle 20, and includes a glovebox 29 and an airbag module 40 provided below the glovebox 29. According to an exemplary embodiment, the airbag module 40 is a knee-airbag configured to provide restraint to the legs, such as the lower legs, of the occupant and to prohibit the tendency of the occupant to submarine.

FIGS. 4-6B disclose an exemplary embodiment of an airbag module 40 that is shown stored in the lower portion of the dashboard 27 of the vehicle 20. The airbag module 40 includes a housing 42, an inflatable airbag cushion 50, and an inflator 41 for providing inflation gas to inflate the airbag cushion 50. The airbag module 40 may include one or more than one fastener 39 to connect, for example, the inflator 41 to the housing 42. The inflator 41 may be configured using any now known or future method for producing inflation gas that inflates the deploying airbag cushion.

Figure 4:
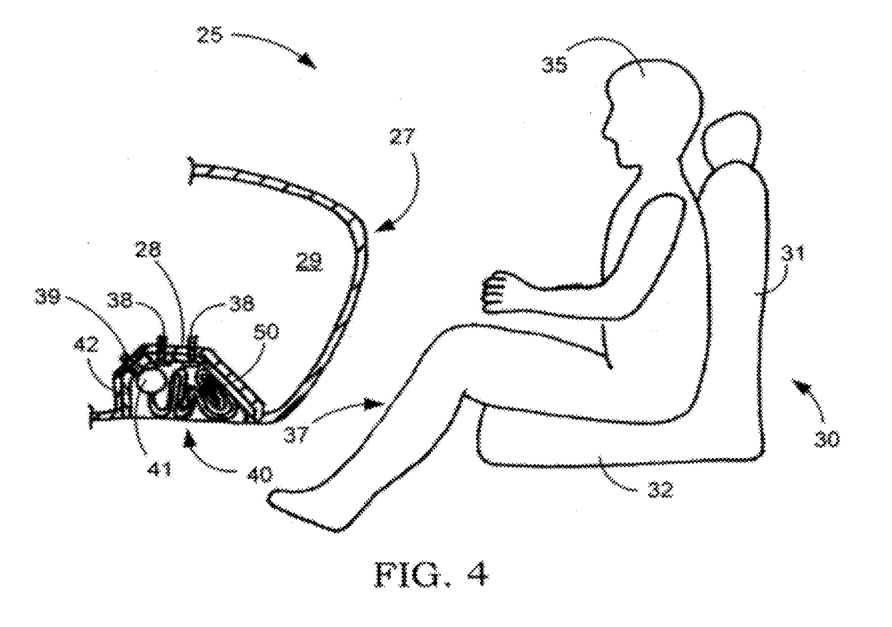
FIG. 4 is a cross-sectional view of the passenger side of the interior compartment of FIG. 2 illustrating an exemplary embodiment of a knee airbag module installed into the lower portion of the vehicle dashboard.

The dashboard 27 of the vehicle 20 may include structural walls 28 configured to allow coupling of the airbag module 40 to the dashboard 27 through, for example, a fastener 38. According to an exemplary embodiment, the airbag module 40 includes a plurality of threaded bolts 38 configured to thread into threaded receiving members, such as nuts, coupled to the structural walls 28 of the dashboard 27 to connect and retain the airbag module 40 to the dashboard 27. According to another exemplary embodiment, the airbag module 40 includes a plurality of threaded nuts, whereby each nut is configured to receive a bolt to connect and retain the airbag module 40 to the dashboard 27. It should be noted that the airbag modules disclosed herein may be connected to the vehicle using any now known or future developed methods and the disclosed methods herein are not meant as limitations.

Figure 6A:
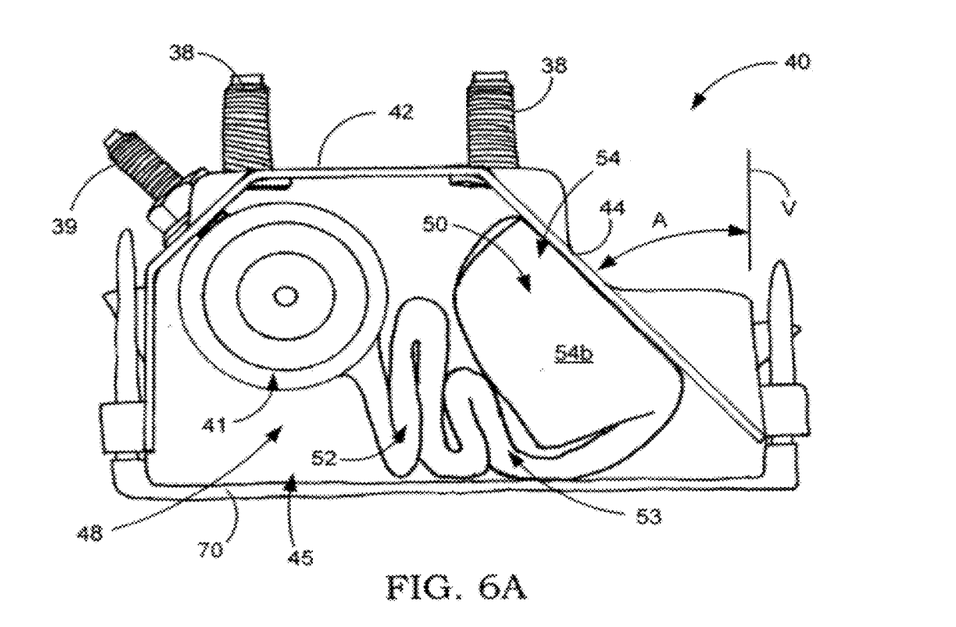
FIG. 6A is a cross-sectional view of the knee airbag module of FIG. 5 shown in the stored configuration.
Figure 6B:
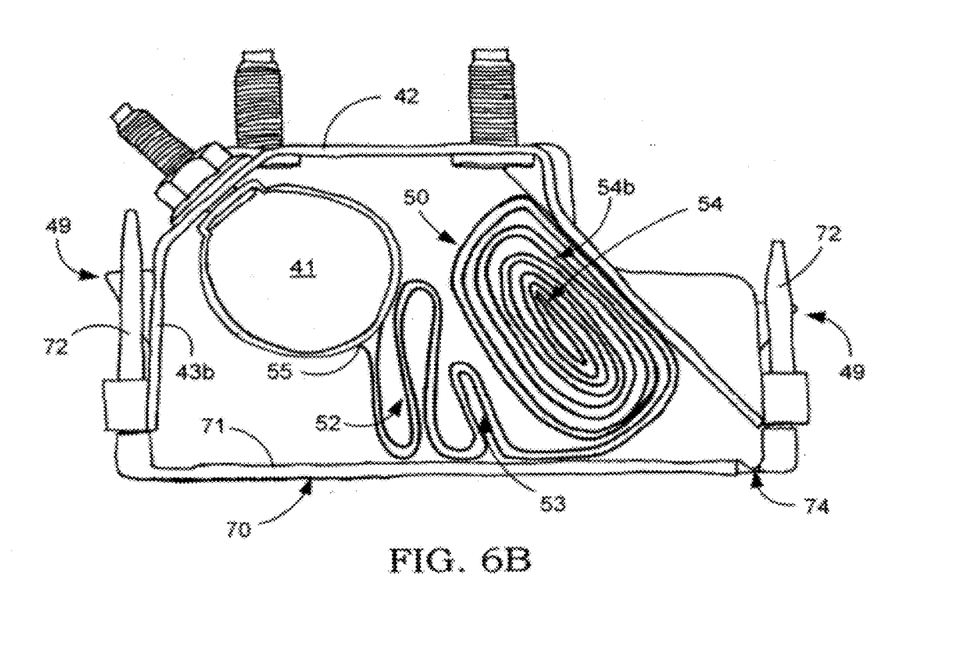
FIG. 6B is a cross-sectional view of the knee airbag module of FIG. 5 shown in the stored configuration.
Figure 7A:
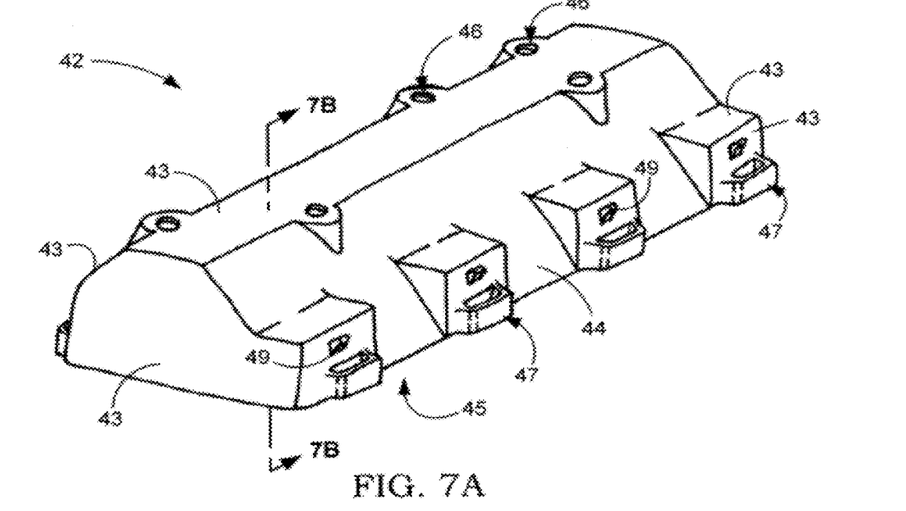
FIG. 7A is a perspective view of an exemplary embodiment of an airbag housing for use in an airbag module, such as the airbag module of FIG. 5.
Figure 7B:
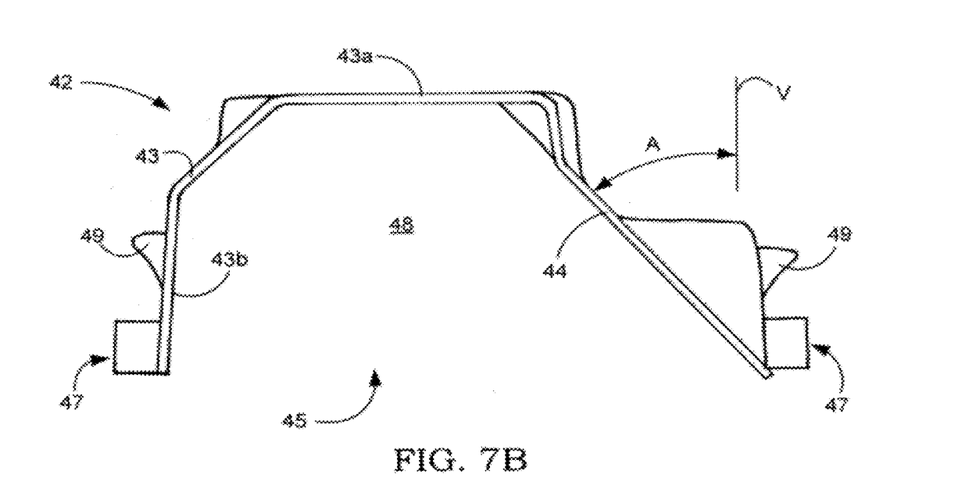
FIG. 7B is a cross-sectional view of the airbag housing of FIG. 7A.

FIGS. 7A and 7B disclose an exemplary embodiment of the housing 42 that is shown configured for use in the airbag module 40. The housing 42 may be made from steel, a composite material (e.g., glass filled polymer), or any suitable material strong enough to withstand the forces generated by the inflator 41 during airbag deployment. The housing 42 includes a plurality of thin walls 43 that together form a compartment (or cavity) 48 and an opening 45. According to an exemplary embodiment, the housing 42 includes a thin walled base 43a, a forward side wall 43b, and an inclined rearward side wall 44, that together form the compartment 48 and the opening 45. The opening 45 allows access to the compartment 48, whereby upon assembly, the inflator 41 and the airbag cushion 50 may be stored within the compartment 48, such as shown in FIGS. 6A and 6B. The opening 45 further allows the deploying airbag cushion 50 to breach the housing 42 (as well as the airbag module 40) to inflate and expand beyond the airbag module 40 to a location provided between the dashboard 27 and the occupant 35, such as the lower legs 37 of the occupant 35.

According to an exemplary embodiment, the inclined rearward side wall 44 of the housing 42 is provided rearward in the housing (and in vehicle) and configured at an oblique angle A relative to vertical, as shown in FIG. 7B, such that the rearward side wall 44 slopes from the base 43a of the housing 42 toward the rearward most edge of the housing 42. According to an exemplary embodiment, the oblique angle A is about forty-five degrees (45°) relative to vertical (labeled "V" in FIG. 7B). According to other exemplary embodiments, the oblique angle A of the housing may be configured at any angle, for example, between zero and ninety degrees (0-90°). Additionally, the oblique angle A may be tailored based on the geometry of the vehicle that the airbag module is to be configured within to optimize deployment of the airbag cushion to provide maximum restraint of the occupant.

The housing 42 may further include one or more than one aperture 46 that is configured to receive a fastener, such as a bolt, to connect the housing 42 of the airbag module 40 to the vehicle 20, such as the dashboard 27. The housing 42 may also include one or more than one aperture 46 that is configured to receive a fastener, such as a bolt, to connect other components of the airbag module 40, such as the inflator 41, to the housing 42.

Figure 5:
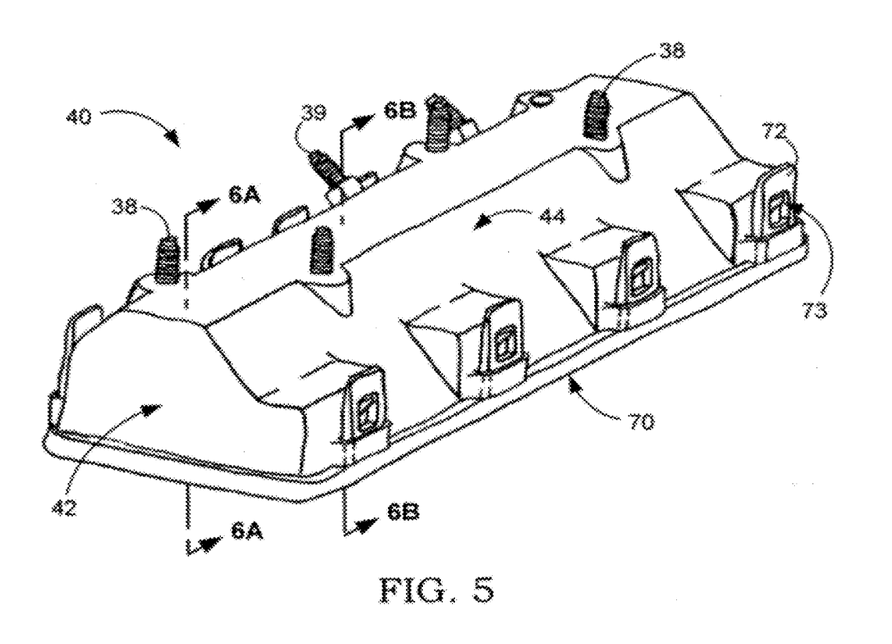
FIG. 5 is a perspective view of the knee airbag module of FIG. 4 shown in the stored configuration and ready for installation into the vehicle.

As shown in FIGS. 6A and 6B, the airbag module 40 may further include a cover member (or cover) 70 configured to cover the opening 45 of the housing 42, thereby together the cover 70 and the housing 42 form a compartment 48 for the airbag cushion 50 and inflator 41. The cover member 70 may protect the stored airbag cushion 50, while allowing the deploying airbag cushion 50 to breach the cover member 70 without impediment or delay to the inflating cushion. According to an exemplary embodiment, the cover member 70 includes a thin walled base 71 configured to cover the opening 45 of the housing 42, and a plurality of legs 72 that extend substantially orthogonal to the base 71. According to an exemplary embodiment, the legs 72 are configured to connect the cover member 70 to the housing 42 to retain the cover member 70 over the opening 45 of the housing 42. The legs 72 may be configured as wedge shaped protrusions having an aperture 73 configured to receive a portion of the housing 42 to retain the cover member 70 in place, as shown in FIG. 5.

The cover member 70 may be configured to include any number of legs 72 on any side of the cover member 70. Each leg 72 of the cover member 70 may be similar configured or uniquely configured, such as having similar or different lengths. It should be noted that the cover member configuration may be tailored to the housing configuration, which may be tailored to the vehicle configuration.

The cover member 70 may further include a separation feature 74 to allow a portion of the base 71 to separate in order for the deploying airbag cushion 50 to inflate without impediment or delay. According to an exemplary embodiment, the separation feature 74 is configured as a thin section located along the base 71 between a leg 72 on a first side of the cover member 70 and another leg 72 on a second side of the cover member 70, such as shown in FIG. 6B. The thin section of the separation feature 74 is configured to tear at a predetermined tension, induced by the pressure exerted on the inside surface of the base 71 from the inflating airbag cushion 50. As shown in FIGS. 9-12, after separating from the rearward side wall 44 (or from the portion of the cover member 70 that engages and remains connected to the rearward side wall), the cover member 70 may remain hingedly connected to the forward side wall 43b, so that when the airbag deploys the cover 70 and rearward side wall 44 are disconnected and the cover 70 and forward side wall 43b remain connected. While in the open position (i.e., disconnected from the rearward side wall 44 and hingedly connected to the forward side wall 43b) shown in FIGS. 9-12, the cover member 70, such as the base 71, may function as a directional guide to the deploying airbag cushion 50 thereby acting to influence the deployment trajectory of the airbag cushion 50.

The housing 42 may further include features 47 configured to connect and retain the cover member 70 to the housing 42 prior to airbag deployment. According to an exemplary embodiment, the feature 47 includes a ring or ovular shaped portion configured to receive one leg 72 of the cover member 70, and a protruding portion 49 that is configured to engage the aperture of the leg 72. It should be noted that the cover member may be connected to and retained by the housing using other suitable features, and the embodiments disclosed herein are not meant to be limitations.

FIGS. 8A-8I disclose an exemplary embodiment of an inflatable airbag cushion 50 that is shown configured for use in the airbag module 40. The airbag cushion 50 includes one or more than one panel 51, which may be made from a conventional high strength material, such as woven nylon fabric, or from any suitable now known or future developed material. The panels 51 forming the airbag cushion 50 may take any suitable shape, which may be tailored for the specific vehicle or application, and may be connected together at seams 56 using stitching or any suitable method (e.g., adhesive) to form an inflatable chamber 57 configured to receive inflation gas during airbag deployment.

The airbag panels 51 may be coated with a coating (e.g., silicone) to prohibit inflation gas from escaping, during deployment, through the porosity of the material forming the airbag panels 51. Additionally, the seams 56 forming the airbag cushion 50 may be sealed with a sealant to prohibit inflation gas from escaping, during deployment, due to separation of the seam 56 caused by separation forces induced by the high internal pressure in the inflating airbag cushion.

Figure 8A:
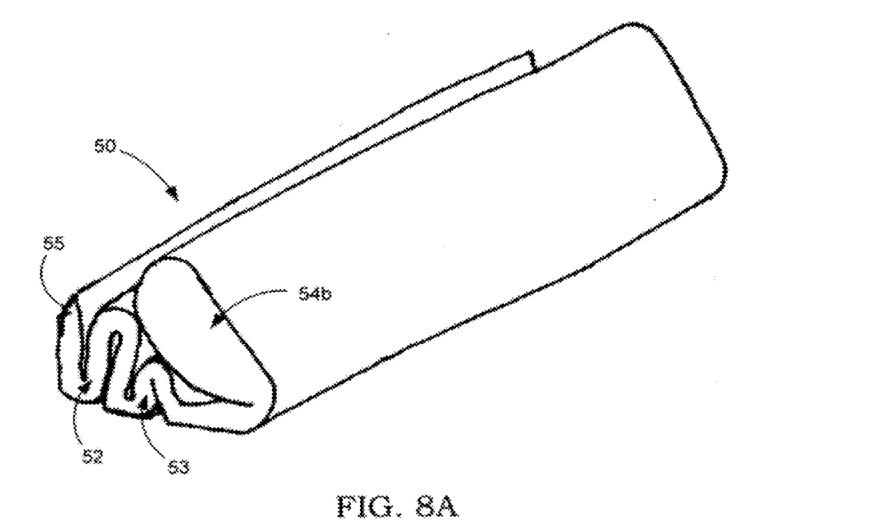
FIG. 8A is a perspective view of an exemplary embodiment of an inflatable airbag cushion shown stored and configured for use in an airbag module, such as the airbag module of FIG. 5.
Figure 8B:
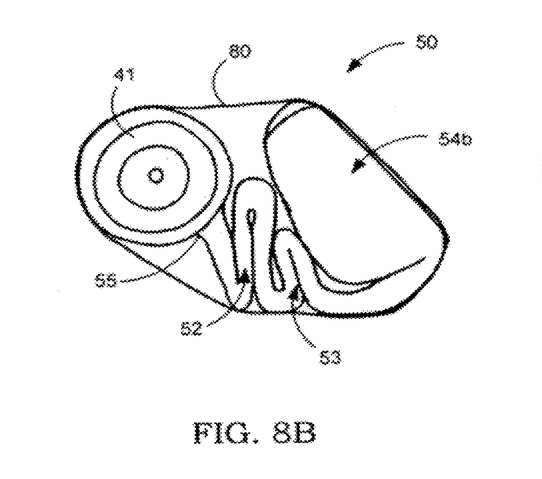
FIG. 8B is a side-view of the airbag cushion of FIG. 8A.
Figure 8C:
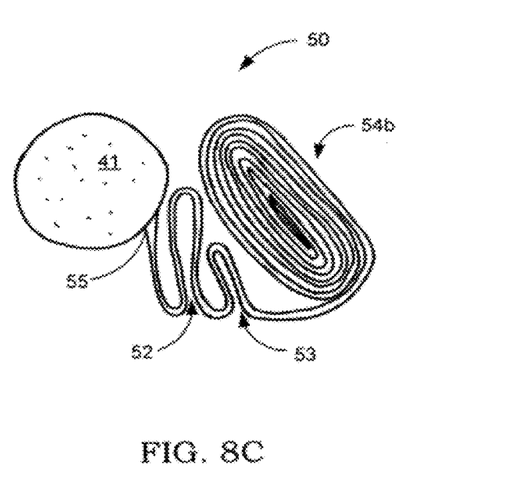
FIG. 8C is a cross-sectional view of the airbag cushion of FIG. 8A.
Figure 8D:
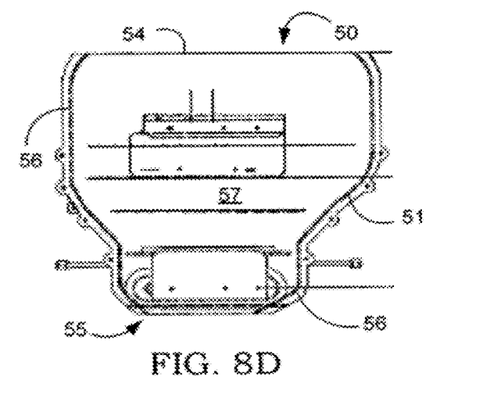
FIGS. 8D-8I are top views of the airbag cushion of FIG. 8A shown in various stages of manipulation progressing toward the stored configuration.

According to an exemplary embodiment, the airbag cushion 50 includes first and second panels 51 having substantially similar shapes when configured in the flat, as shown in FIG. 8D, whereby the panels 51 are connected along the seam 56 to form the inflatable chamber 57. The airbag cushion 50 includes a first end portion 54 configured to deploy to a position farthest away from the airbag module and a second end portion 55 configured to couple the airbag cushion 50 to the inflator 41 of the airbag module 40 in order for the inflator to direct inflation gas into the inflatable chamber 57 of the airbag cushion 50 during deployment.

The airbag cushion 50 may be manipulated into a stored configuration through a process of folding, rolling, or a combination of folding and rolling. The stored airbag cushion configuration allows for easy assembly of the cushion into the airbag module in a manner having a reduced package size or volume.

Figure 8E:
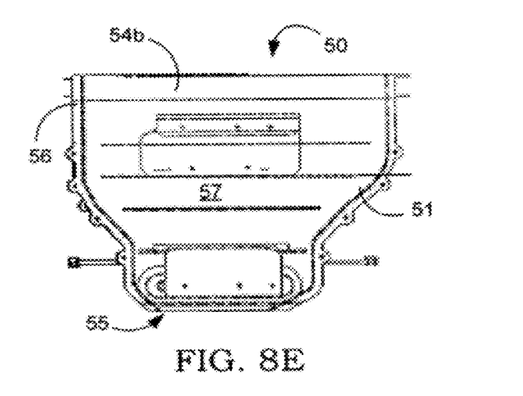
Figure 8F:
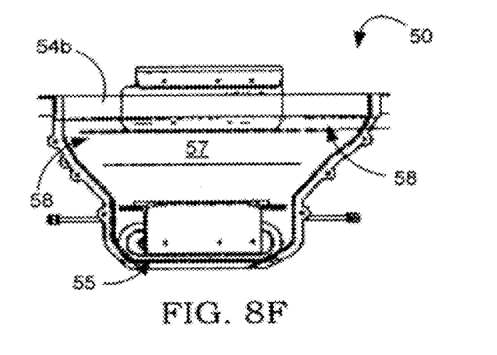
Figure 10:
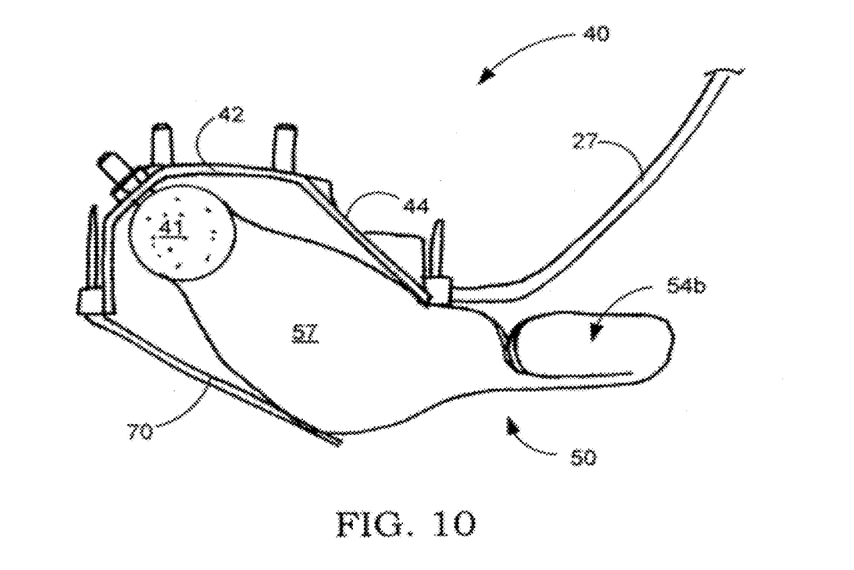
Figure 11:
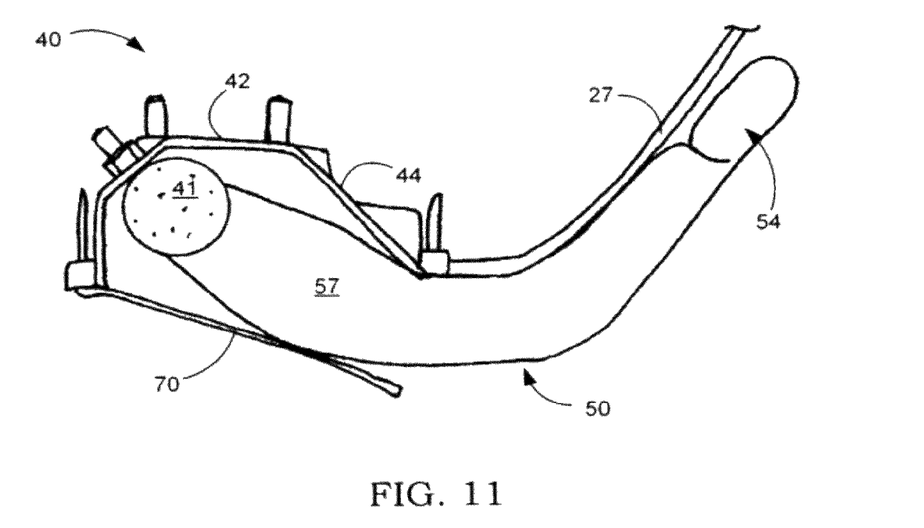
Figure 12:
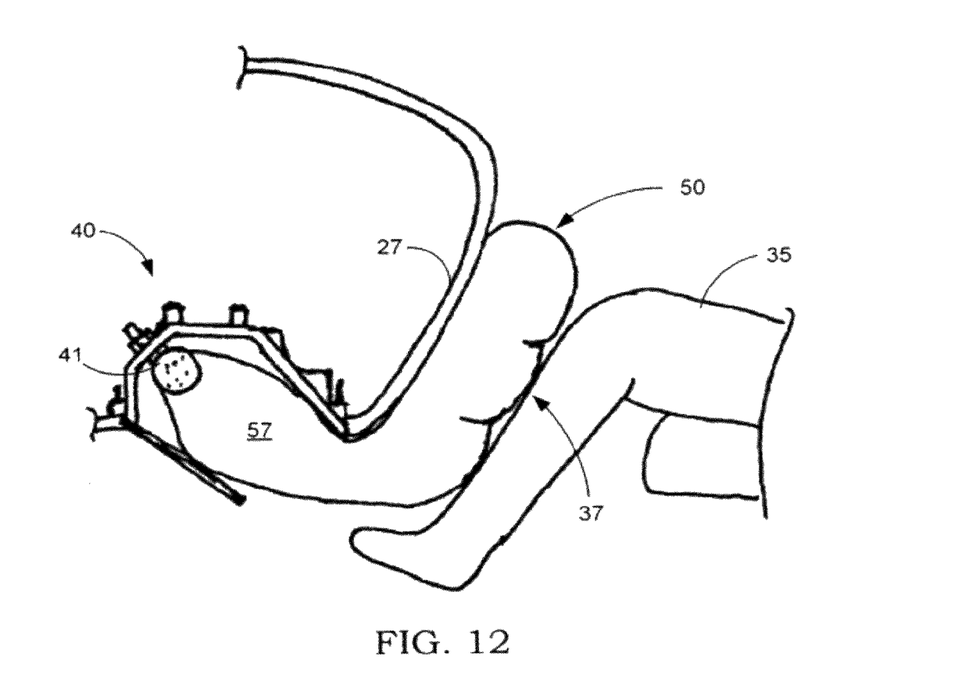
FIG. 12 is a cross-sectional view of the passenger side of the interior compartment of FIG. 4 illustrating the airbag module deployed to provide restraint to the seated occupant.

According to an exemplary embodiment, the airbag cushion 50 is configured using a five step method. The first step involves rolling the first end portion 54 of the airbag cushion 50 (i.e., the end of the cushion opposite the second end portion 55 that couples to the inflator) to form a rolled portion 54b, as shown in FIGS. 8E and 8F. The rolled portion 54b may include one layer of the airbag cushion 50 or may include a plurality of layers of the airbag cushion 50, the number of which may be tailored to the airbag or vehicle configurations (e.g., size, geometry, etc.). The rolled portion 54b faces forward or upward (i.e., away from the passenger compartment). When the airbag cushion 50 inflates, the rolled portion 54b unrolls and is positioned between the lower legs 37 of the occupant 35 and the instrument panel 26 and/or the dashboard 27, as shown in FIGS. 10-12.

Figure 8G:
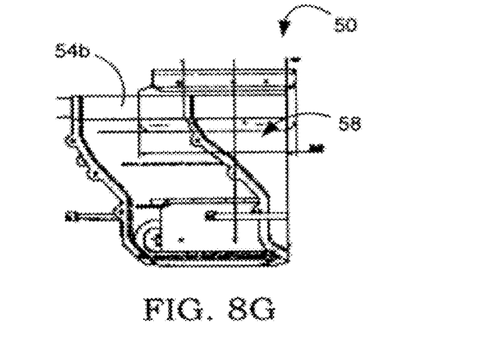
Figure 8H:
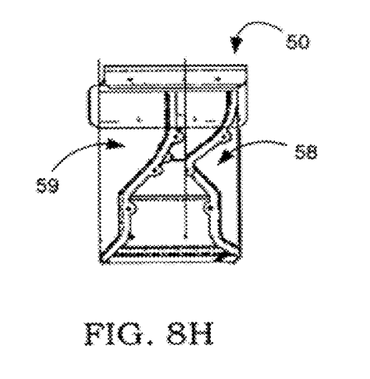
Figure 8I:
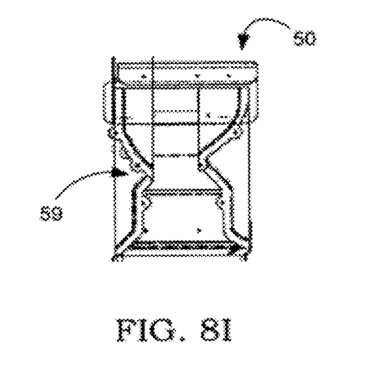

The second step involves folding a first portion 58 of one side of the airbag cushion onto the cushion, then folding a portion of the first portion 58 back onto the remaining portion of the first portion, as shown in FIGS. 8G and 8H. The third step involves folding a second portion 59 of the other side of the airbag cushion onto the cushion, then folding a portion of the second portion 59 back onto the remaining portion of the second portion, as shown in FIGS. 8H and 8I. The fourth step involves folding the section adjacent to the second end portion 55 to form a first folded portion 52, as shown in FIGS. 8B and 6B. The fifth step involves folding the section of the cushion between the first folded portion 52 and the first end portion 54 to form a second folded portion 53, as shown in FIGS. 8B and 6B. According to another embodiment, the airbag cushion 50 may be enclosed by a covering layer 80, such as shown in FIG. 8B. The covering layer 80 may help retain the airbag cushion 50 in the stored configuration (i.e., its folded and/or rolled configuration). The covering layer 80 may vacuum seal the airbag cushion 50 within the covering layer 80.

According to an exemplary embodiment, the first folded portion 52 and second folded portion 53 are configured as Z-folds, whereby the first Z-fold 52 extends about 40 mm in length and the second Z-fold 53 extends about 20 mm in length. The first and second folded portions 52, 53 aid deployment of the cushion and particularly the first end portion 54 of the cushion 50 by inflating prior to the end portion 54 thereby pushing the end portion 54 along the rearward side wall 44 of the housing 42 to breach the housing 42 of the module 40. The first and second folded portions 52, 53 aid in aligning the deploying end portion 54 of the cushion 50 to unroll during inflation in a direction along the rearward facing portion of the dashboard. The lengths of the first and second folded portions 52, 53 are tailored to drive the end portion 54 of the cushion 50 the optimal distance from the compartment 48 of the housing 42 beyond the housing 42 and adjacent dashboard, yet allow the end portion 54 to remain proximate to the dashboard to inflate (and unroll) adjacent to the rearward facing portion of the dashboard.

According to other embodiments, the folded portion (e.g., first folded portion 52 and the second folded portion 53) of the airbag cushion 50 may be configured as other types of folds (e.g., a plurality of Z-folds, a V-fold) and/or other types of rolls. In addition, the folds of the folded portion may have similar or unique lengths that may be any length (e.g., 2 mm, 200 mm, etc.). The lengths of the folds of the folded portion of the cushion may be tailored to the vehicle configuration, and may vary from vehicle to vehicle, and the lengths and configurations disclosed herein are not meant as limitations.

The second end 55 of the airbag cushion 50 may be coupled to the inflator 41. The assembly of the stored airbag cushion 50 and inflator 41 may then be configured within the compartment 48 of the housing 42 into the stored configuration, such as shown in FIG. 6A. The inflator 41 may connect to the housing 42 using fasteners 39 or other connecting methods. Then, the cover member 70 may be connected to the housing 42 to cover the opening 45 of the housing 42.

As shown in FIGS. 6A and 6B, the end portion 54 (e.g., the rolled portion 54b) of the airbag cushion 50 may be stored adjacent to the rearward side wall 44 of the housing 42 in the compartment 48 of the housing 42, and the inflator 41 may be stored adjacent to the forward side wall 43b. This configuration allows for deployment of the airbag cushion 50 without impediment or delay from the inflator 41 and further allows the rearward side wall 44 to provide a ramp to influence the deployment trajectory of the deploying end portion 54 of the cushion 50, so that the end portion 54 is aligned properly to inflate (and unroll) along the rearward facing portion of the dashboard. According to another exemplary embodiment, the end portion 54 of the airbag cushion is stored adjacent to and abutting the rearward side wall 44 of the housing 42 in the compartment 48 of the housing 42. The end portion 54, such as the rolled portion 54b, of the airbag cushion 50 may be aligned at an angle of incline substantially similar to the oblique angle A, or may be aligned at an angle relative to the oblique angle A.

Figure 9:
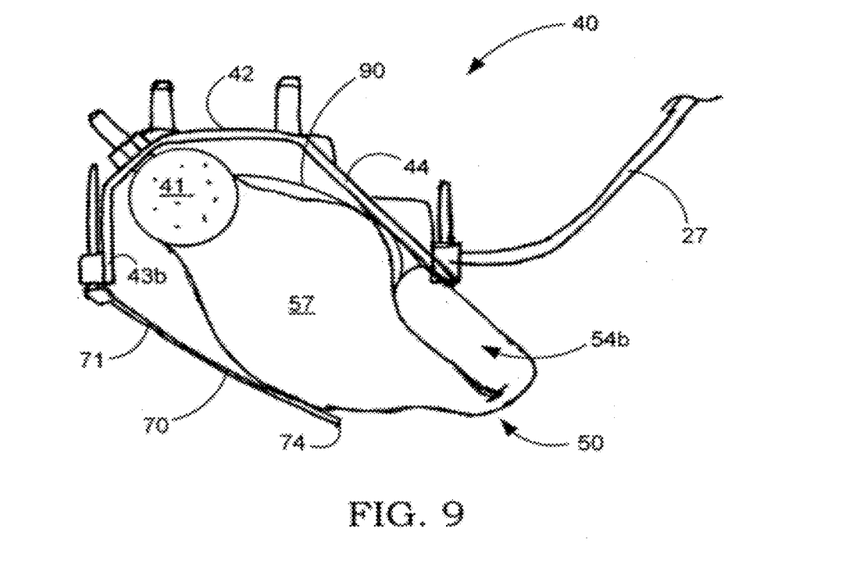
FIGS. 9-11 are cross-sectional views of the passenger side of the interior compartment of FIG. 4 illustrating the airbag module at varying increments of time during airbag deployment.

FIGS. 9-12 disclose the airbag module 40 illustrated at various time increments during airbag deployment. The rolled portion 54b including the end portion 54 of the airbag cushion 50 that is stored adjacent to the rearward side wall 44 of the housing 42 is configured to initially deploy in a downward and oblique direction along the ramp formed by the rearward side wall 44 of the housing 42. During the initial moments of deployment, for example, from zero to about five milliseconds (0-5 ms) following initiation of airbag deployment, the inflator 41 produces inflation gas that first inflates the first Z-fold 52 of the folded portion of the airbag cushion 50, then inflates the second Z-fold 53 of the folded portion of the airbag cushion 50 to form the inflated portion of the inflatable chamber 57 as shown in FIG. 9. The inflation and expansion of the folds 52, 53 of the folded portion of the airbag cushion 50 creates forces that induce the end portion 54 of the airbag cushion 50 to deploy initially along the ramp formed by the rearward side wall 44 of the housing 42 (and hence at the angle of incline formed by the rearward side wall 44). The rearward side wall 44 being tailored with an oblique angle A allows the end portion 54 of the cushion 50 to breach the airbag module 40 displacing in a direction that optimizes deployment.

The lengths of the first and second folds 52, 53 of the folded portion of the cushion influence the time during deployment when the deploying airbag cushion changes direction. The lengths of the folds of the folded portion determine the volume of inflation gas that fills the portions of the cushion having the folds. Once the folds 52, 53 of the folded portion fill with inflation gas, the increasing internal pressure within the inflatable chamber 57 drives inflation of the rolled portion 54b of the cushion 50, which influences the trajectory of deployment of the cushion. The end portion 54 being stored in a rolled configuration, begins to unroll when inflated, altering the deployment direction of the cushion 50. This configuration of the cushion 50 alone, or in combination with the aid of a tether, redirects deployment of the cushion 50 from the oblique angle caused by the rearward side wall 44 of the housing 42 to a direction approximately horizontal along or parallel with the bottom of the dashboard 27, as shown in FIG. 10. Then, the rolled portion 54b of the airbag cushion 50 continues to inflate and unroll in an oblique direction that is upward and rearward along the rearward facing surface of the dashboard 27.

The airbag cushion 50 deploys between the dashboard 27 and the occupant 35, such as the lower legs 37 of the occupant, as shown in FIG. 12. The deployed airbag cushion 50 restrains the occupant and protects the occupant from direct impact with the dashboard. It should be noted that the length of the folds and/or the oblique angle of the inclined surface may be tailored, such as to the vehicle geometry, to optimize the transition of the airbag cushion from breaching the module to deploying to a location to provide restraint to the occupant.

The airbag module 40 may further include a tether 90, such as shown in FIG. 9. According to an exemplary embodiment, the airbag module 40 includes a first external frangible tether 90 configured to aid in the positioning of the airbag cushion and to influence the deployment trajectory of the airbag cushion 50. The external frangible tether 90 may be configured according to now known or future developed technology. The tether 90 may attach to one or more than one location on the cushion 50, may attach to the inflator 41, or to the housing 42. According to another exemplary embodiment, the airbag module includes a plurality of tethers that are configured to influence the deployment trajectory of the airbag cushion. The tethers may be configured external or internal to the airbag cushion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A knee airbag module for restraining an occupant seated in the interior compartment of a vehicle, the airbag module configured to be mounted at a bottom portion of a dashboard of the vehicle, comprising:

a housing configured to couple to the vehicle;
a cover connected to the housing, wherein the cover is configured to face downward when the airbag module is installed and coupled to the vehicle;
an inflatable airbag cushion stored in the housing and configured to inflate and deploy out of the housing to a location forward of the legs of the seated occupant; and
an inflator provided in the housing and configured to provide inflation gas to inflate the airbag cushion;
wherein the housing includes a base, a forward side wall and a rearward side wall and wherein the base and side walls together with the cover form a compartment for housing the airbag prior to deployment;
wherein a portion of the rearward side wall adjacent to the cover is inclined away from a vertical plane a greater amount than a portion of the forward side wall adjacent to the cover;
wherein the airbag cushion includes an end portion rolled into a rolled portion and configured to deploy to a position farthest from the airbag module and wherein the end portion is positioned adjacent to the rearward side wall; and
wherein during deployment of the airbag cushion the inclined portion of the housing guides the rolled portion of the deploying cushion in a downward direction when breaching the housing;
wherein in a closed position, the cover is substantially horizontal, and in an open position, the cover is rearwardly declined to guide the airbag cushion in a rearward direction during deployment.

2. The airbag module of claim 1, wherein the end portion of the airbag cushion is positioned in the housing so that the rolled portion faces away from the interior compartment of the vehicle.

3. The airbag module of claim 2, wherein the airbag cushion includes a folded portion provided adjacent to the rolled portion, wherein the folded portion inflates prior to the rolled portion of the airbag cushion during deployment.

4. The airbag module of claim 3, wherein the airbag cushion is stored in the module in a position so that inflation of the folded portion of the airbag cushion during airbag deployment creates forces that induce the rolled portion of the cushion to deploy initially at the angle of incline formed by the rearward wall.

5. The airbag module of claim 3, wherein the ratio of the length of the rolled portion of the cushion to the length of the folded portion of the cushion is between 9:1 and 1:1, wherein the lengths of the cushion are cross-sectional profile lengths.

6. The airbag module of claim 3, wherein the folded portion of the cushion includes two Z-folds provided adjacent to one another.

7. The airbag module of claim 1, further comprising at least one tether to influence the deployment trajectory of the airbag cushion during airbag deployment.

8. The airbag module of claim 1, wherein the cover is hingedly connected to the forward side wall so that when the airbag deploys the cover and rearward side wall are disconnected and the cover and forward side wall remain connected.

9. The airbag module of claim 1, wherein when the cover is in a closed position, the cover is configured to be positioned forward of the dashboard so as to not be visible by the occupant seated in the interior compartment of the vehicle.

* * * * *